United States Patent [19]

Kimura

[11] Patent Number: 4,461,557
[45] Date of Patent: Jul. 24, 1984

[54] MIRROR ARRANGEMENT FOR USE IN A SINGLE LENS REFLEX CAMERA

[75] Inventor: Kazuo Kimura, Sakai, Japan

[73] Assignee: Minolta Camera Kabushiki Kaisha, Osaka, Japan

[21] Appl. No.: 421,054

[22] Filed: Sep. 22, 1982

[30] Foreign Application Priority Data

Sep. 22, 1981 [JP] Japan ................... 56-150115

[51] Int. Cl.³ .......................... G03B 3/00; G03B 19/12; G02B 27/14
[52] U.S. Cl. ..................... 354/402; 354/479; 354/152; 350/172
[58] Field of Search ............... 354/31, 31 F, 23 R, 354/54–56, 59, 152, 155, 219, 224, 225, 402, 479; 350/163, 164, 166, 172

[56] References Cited

U.S. PATENT DOCUMENTS

| 1,253,138 | 1/1918 | Brewster | 350/172 |
| 2,220,862 | 11/1940 | Blodgett | 350/164 X |
| 3,356,523 | 12/1967 | Libbert | 350/166 X |
| 3,521,542 | 7/1970 | Goederen | 354/55 |
| 3,540,364 | 11/1970 | Ono | 354/55 |
| 4,185,191 | 1/1980 | Stauffer | 354/25 X |
| 4,392,729 | 7/1983 | Tsunefuji | 354/152 |

FOREIGN PATENT DOCUMENTS 53-11930 10/1978 Japan ...................... 354/25

*Primary Examiner*—William B. Perkey
*Attorney, Agent, or Firm*—Jackson, Jones & Price

[57] ABSTRACT

A mirror arrangement for use in a single lens reflex camera which divides a light transmitted through an objective lens of the camera into a first portion led to a viewfinder and a second portion led to a light receptor which detects a focusing condition of the objective lens or the like, is disclosed. The mirror arrangement comprises a total reflection mirror surface and a plurality of light transmitting slits arranged thereon in parallel to each other. A width of each slit is limited less than 80μ. Pitches between two adjacent slits in the width direction are over than two times of an average width of all slits, and have at least two different values.

20 Claims, 26 Drawing Figures

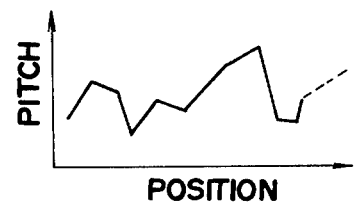
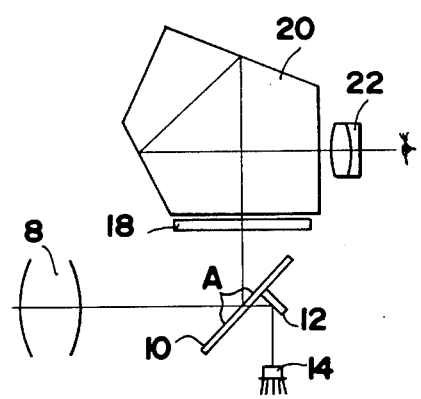
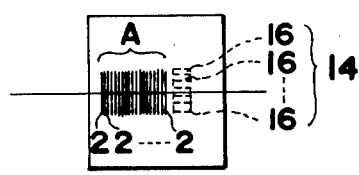
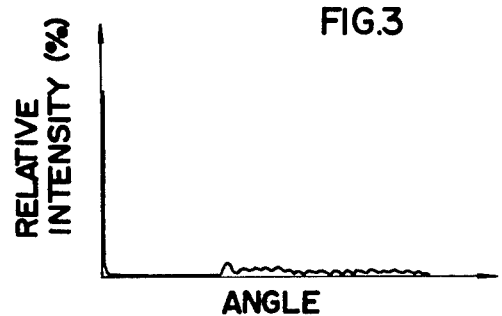
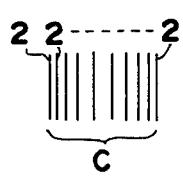
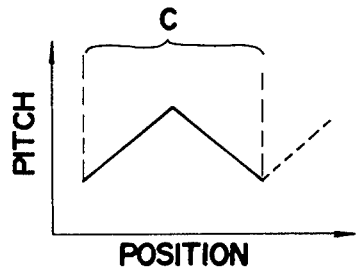

MIRROR ARRANGEMENT FOR USE IN A SINGLE LENS REFLEX CAMERA

BACKGROUND OF THE INVENTION

1. Field of the Invention

The present invention relates to a mirror arrangement for use in a single lens reflex camera, and more particularly relates to a mirror arrangement for use in a single lens reflex camera wherein the light transmitted through an objective lens is divided into reflected light directed to a viewfinder and transmitted light which is passed to a light receptor for detecting a focusing condition or the like.

2. Description of the Prior Art

In a mirror arrangement of the kind described above, it has been known to divide the light transmitted through the objective lens into two portions by means of a half-mirror with a semi-transparent film of a metal such as aluminum or silver. However, with such a half-mirror, the half-mirror itself absorbs some of the light, making the image in the viewfinder dark and preventing the light receptor from receiving light of sufficient intensity. A means of improving such defects has been proposed in Japanese patent Laid Open No. 119030/1978, which discloses a mirror arrangement including a total reflection mirror surface with a plurality of very small transmitting pinholes disposed at random thereon. This mirror arrangement divides the light transmitted through the objective lens into a first portion that is led to the viewfinder by reflection, and a second portion that is led to the light receptor by transmission therethrough. With this construction, there is substantially no light absorbed by the mirror arrangement. However, the light transmitted through the mirror arrangement is diffracted by the pinholes over a wide range, therefore, an image forming condition of the objective lens is not maintained by the light transmitted through the mirror arrangement. Accordingly, if the light receptor is constructed to detect the image forming condition of the objective lens for discriminating a focusing condition of the lens, for example, if the light receptor comprises a plurality of small light receiving cells arranged in a predetermined direction as disclosed in U.S. Pat. No. 4,185,191, it is difficult to detect the focusing condition of the objective lens.

Furthermore, in the above mirror arrangement, it is troublesome to inspect the product because the degree of randomness of the light transmitting pinholes disposed on the total reflection mirror surface must be inspected.

SUMMARY OF THE INVENTION

It is an object of the present invention to eliminate the aforementioned defects of the prior art, and to provide a mirror arrangement for use in a single lens reflex camera wherein the light transmitted through the objective lens is divided into a first portion that is led to the viewfinder by reflection on the mirror arrangement and a second portion that is led to a light receptor, for detecting a focusing condition of the objective lens or the like, by transmission through the mirror arrangement, and wherein the inspection of the product is easy.

It is another object of the present invention to provide a mirror arrangement for use in a single lens reflex camera wherein the light transmitted through the objective lens is divided into a first portion that is led by the reflection on the mirror arrangement to the viewfinder and a second portion that is led by the transmission through the mirror arrangement to the light receptor for detecting an image forming condition of the objective lens in order to discriminate a focusing condition of the lens, and wherein the focusing condition can be detected by the light receptor.

To achieve the above objects, the mirror arrangement according to the present invention comprises a total reflection mirror surface with a plurality of light transmitting slits disposed in parallel with each other thereon for dividing the light transmitted through the objective lens. However, if a plurality of the light transmitting slits are arranged at a constant pitch in its width direction, some of the bright lines are observed in the viewfinder because the light rays reflected on the mirror surface interfere and intensify each other due to interference. Therefore, an easy-to-see image is not produced in the viewfinder because of the bright lines.

Then, another object of the present invention is to provide a mirror arrangement for use in a single lens reflex camera wherein the light transmitted through the objective lens is divided by means of a total reflection mirror surface with a plurality of light transmitting slits disposed thereon, and wherein an easy-to-see image is produced in the viewfinder without the above bright lines.

In order to avoid the occurance of the bright lines, two different approaches are considered. One of them is based on the fact that the wider the constant pitch of the light transmitting slits, the narrower the region in which the above bright lines are produced. Therefore, the approach is to widen the constant pitch for reducing the spacing between a normal image formed by the light rays which are not diffracted by the mirror arrangement and the above bright lines in order to make the bright lines invisible. However, in such approach, in order to maintain the predetermined transmittance and reflectance within a predetermined area, it is necessary to spread the width of the slits proportional to any widening of the constant pitch of the slits. However, this produces some of dark lines due to the slits in the viewfinder, which causes an undesirable finder image.

Another approach is based on an attempt to reduce the interference itself. This is achived by disposing a plurality of the light transmitting slits at random along the width direction for reducing the interference. However, in this approach, if a pitch between two adjacent slits is too small, one of the dark lines is observed in the finder image. Reversely, if the pitch is too long, the finder image is observed such that the brightness thereof is discontinuously different.

Experimentally the width of the slits has been found to be ideally 80$\mu$ or less, while the pitch, or distance between the centers of the two adjacent slits, has been found to be ideally at least twice the average slit width, and finally there should be at least two different pitches.

BRIEF DESCRIPTION OF THE DRAWINGS

FIG. 1a is a diagram illustrating a disposition of the light transmitting slits of the mirror arrangement in an embodiment of the present invention;

FIG. 1b is a graph illustrating the relationship between the pitch and the position in the width direction of the slits in the embodiment of FIG. 1a;

FIG. 2a is a diagram illustrating the optical system of a single lens reflex camera in which the mirror arrangement of FIG. 1a is used;

FIG. 2b is a diagram illustrating the relationship between the direction of extension of the slits and the direction of disposition of the light receiving cells in the camera of FIG. 2a;

FIG. 3 is a graph illustrating the relative intensity of diffracted light of the embodiment of FIG. 1a;

FIG. 4a is a diagram illustrating the disposition of the slits in another embodiment of the present invention;

FIG. 4b is a graph illustrating the relationship between the pitch and the position in the width direction of the slits in the embodiment of FIG. 4a;

FIG. 5 is a graph illustrating the relative intensity of diffracted light of the embodiment of FIG. 4a;

DESCRIPTION OF THE PREFERRED EMBODIMENTS

Figure 5:
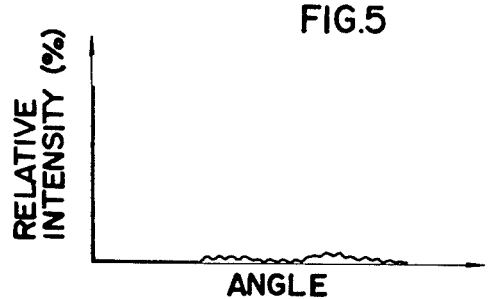

FIG. 1a is a diagram showing the disposition of the light transmitting slits formed on a total reflection mirror surface according to a preferred embodiment of the present invention, while FIG. 1b is a graph illustrating variations in the pitch and the width direction of the slits. In the embodiment of FIG. 1a, a plurality of light-transmitting slits 2 are arranged on a total reflection mirror surface for a single lens reflex camera, all being of the same form, with a width no greater than 80μ and a length of 13,000μ. The slits are arranged mutually in parallel so that they all extend in a single direction. The pitch between two adjacent slits is at least twice the width of the slits, and the ratio between the minimum pitch and the maximum pitch is approximately 1:3, with various pitches being randomly positioned within that range. In the area of the light splitting portion with the light-transmitting slits 2, the total area of all slits 2 make up 15% of the total area of the light splitting portion. The area occupied by the slits 2 may be selected comprises 10% to 30% of the area of the light-splitting portion by selecting the pitch in accordance with the desired reflectance and transmittance.

A mirror with a plurality of light-transmitting slits formed on the total reflection surface as described above, may be used, as shown in FIGS. 2a and 2b, as the main mirror of a single lens reflex camera with a focusing detection device comprising a plurality of light receiving cells. In FIG. 2a, light passes through an objective lens 8 to a main mirror 10 which has a light dividing portion A comprising a plurality of light-transmitting slits 2 as described above, the mirror 10 splits the light into two portions, of which a first portion, reflected by the main mirror 10, is directed to the viewfinder which comprises a focusing screen 18, a pentaprism 20, and an eyepiece 22. Another portion of the light transmitted through the lens 8 is transmitted through a plurality of light-transmitting slits 2 formed on the mirror surface toward a sub-mirror 12 positioned behind the main mirror 10, and then the portion of light is reflected on the sub-mirror 12 to a light receptor 14 fixed on a camera body. The light receptor 14 comprises a plurality of light receiving cells 16 arranged in a predetermined direction for detecting an image forming condition of the lens 8. A plurality of slits are arranged in parallel with each other other such that all of the slits extend in parallel with a direction along which the plurality of light receiving cells 16 are aligned, as shown in FIG. 2b.

FIG. 3 is a graph showing a relation between the relative intensity of the reflected light and the diffraction angle of the reflected light. It will be shown in the graph that, in the vicinity of zero order diffracted light (i.e. light that is not diffracted) the intensity is virtually zero, and there is a slight intensity peak at a diffraction angle around the first order diffracted light of the average slit pitch. Beyond that, the intensity gradually decreases. Accordingly, in this embodiment, no bright flare lines will be visible in the viewfinder, and since the width of the slits themselves are sufficiently narrow, any dark line due to a slit is not observed in the viewfinder. Furthermore, since a broad gap between two adjacent slits is not produced, it is possible to avoid any apparent discontinous brightness in the finder image.

Further, in this embodiment, as to the diffraction of the light transmitted through the light-transmitting slits 2, the diffraction in the direction of the width of the slits serves to broaden the range of focus detection, and in the direction of the length of the slits, almost only non-diffracted light is received by the light receptor 14, so accuracy of focus detection is not deteriorated.

FIG. 4a illustrates the disposition of the light-transmitting slits 2 according to another embodiment of the present invention, and FIG. 4b is a graph illustrating the changes in the pitch thereof in the width direction. In this embodiment, the light-transmitting slits 2 are all of the same form as those of the embodiment of FIG. 1a, but their disposition differs in that the pitch is at least two times the width of the slits, the ratio between the minimum and the maximum pitches is within the range 1:1.1–1;3, and the pitch gradually increases and then decreases in the direction of the width of the slits within a single block c, the block being repeated. The width of a single block c is approximately 1 to 3 mm, and there are 4 to 13 of these blocks provided in the light splitting portion. Like that shown in FIGS. 2a and 2b, the disposition of this embodiment is formed on a total reflection mirror surface for use in the main mirror of a single lens reflex camera which has a plurality of light receiving cells disposed in a predetermined direction, and the direction in which the slits extend is disposed so as to be parallel with the direction in which a plurality of the light receiving cells are arranged.

FIG. 5 illustrates the intensity distribution of reflected light in the embodiment of FIG. 4a, and as will be clear from a comparison with FIG. 3, with the disposition of this embodiment, no intensity peaks of the diffracted light are produced, and the overall intensity of the refracted light can also be made low. The reason for this result is believed to be the regularity in the arrangement of the slits wherein diffracted light is cancelled.

Figure 6A:
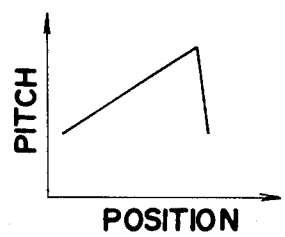
FIGS. 6a to 6f are graphs respectively showing the relationship between the pitch and the position in the width direction of the slits of various other embodiments of the present invention.
Figure 6B:
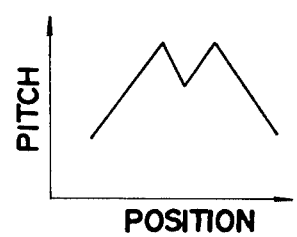
Figure 6C:
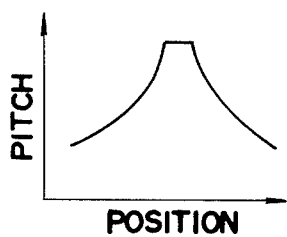
Figure 6D:
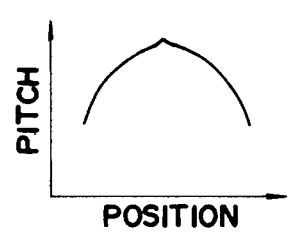
Figure 6E:
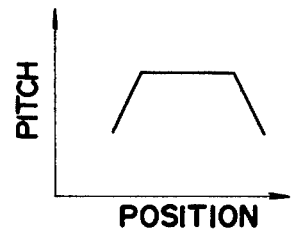
Figure 6F:
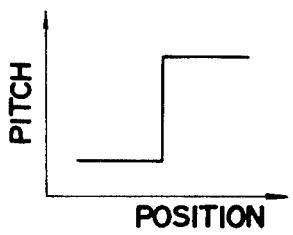

FIGS. 6a to 6f respectively illustrate the variations in pitch in the width direction according to some further embodiments of the present invention, each illustrating the pitch variations within a single block unit such as the repeated block unit of FIGS 4a and 4b. FIG. 6a shows a block in which the pitch varies in such a way that its graph forms a laterally asymmetrical mound. FIG. 6b shows a block in which the pitch varies with a central depression atop a mound, like a volcano in cross-section. Namely, in the embodiment of FIG. 6a, the block unit comprises a first part in which the pitches are gradually increased, a second part in which the pitches are gradually decreased, a third part in which the pitches are gradually increased again, and a fourth part in which the pitches are gradually decreased again in the width direction. The number of slits in the first part is equal to that in the fourth part, and the number of slits in the second part is equal to that in the third part. FIG. 6c shows also volcano-like graph with upwardly curving concave sides approaching to a small plateau centrally at the top. FIG. 6d has convex curving sides in which the direction of curvature reverses just before the center as viewed from both sides, to produce a small projecting "nipple" in which the pitches are greatly varied. FIG. 6e shows a block in which the pitch varies to produce a trapezoidal graph. And FIG. 6f shows a block in which the pitch is stepped, going from minimum to maximum pitch in a single step. The length of any of the aforementioned blocks in the direction of the width of the slits, is 1 to 3 mm. The light-transmitting slits are all of the same form, and are of no more than 80μ width. In each of the embodiments illustrated in FIGS. 6a to 6f, the pitch is determined such that the number of pitches greater than the average pitch, and the number of pitches smaller than the average pitch are substantially equal, so that adjacent slits will neither be too close together nor too far apart.

Figure 7A:
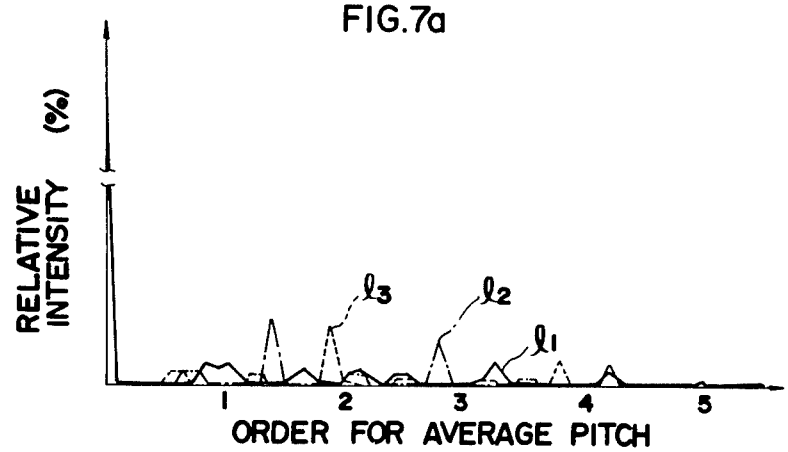
FIGS. 7a to 7c are graphs respectively illustrating the relative intensity of the diffracted light in the reflected light with two different slit pitches as in the embodiment of FIG. 6f, wherein the two pitches and the number of slits are varied.
Figure 7B:
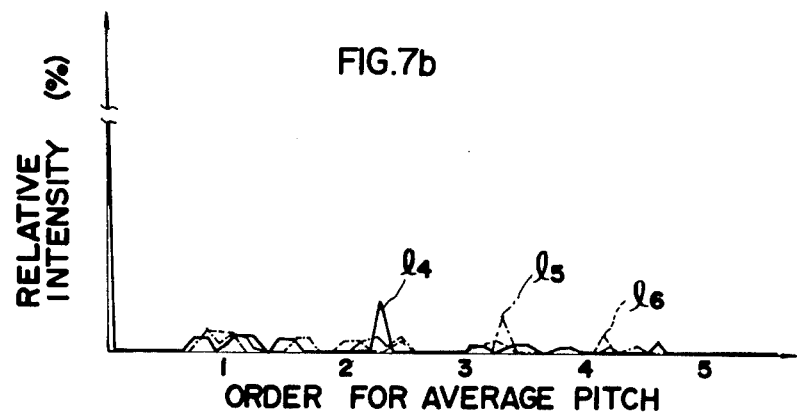
Figure 7C:
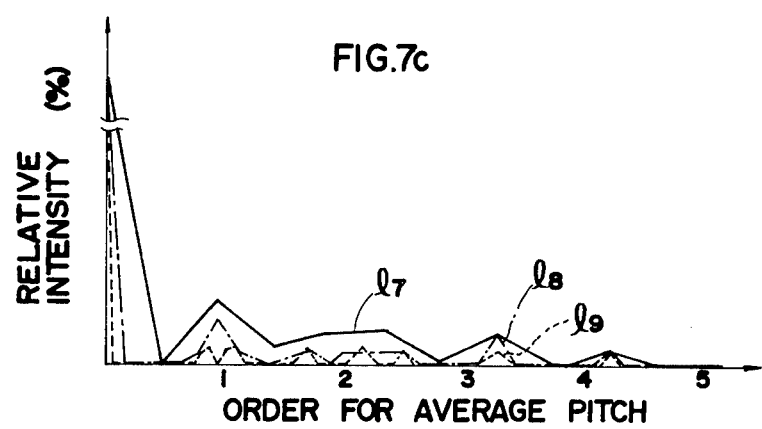

FIGS. 7a and 7c illustrate the reflected light intensity distribution with various different pitch combinations and various numbers of slits at each pitch in the case shown in FIG. 6f. The slit width is fixed at 40μ. FIG. 7a shows the intensity distribution of the reflected light with five slits at a first pitch a and five slits at a second pitch b. 11 is the case where a=320μ and b=250μ (a:b=1.28:1), 12 is where a=380μ and b=190 μ (a:b=2:1), and 13 is where a=420μ and b=140μ (a:b=3:1). The horizontal axis indicates the order of refraction with respect to the average pitch. As is clear from the graph, the intensity of the diffracted light is increased at about the first and second orders for an average pitch (1.14 for 11, 1.5 for 12, and 2 for 13), giving a high intensity of reflected light. However, as will also be clear from the graph, it is possible to avoid any diffraction of the reflected light appearing as bright flare lines by making the ratio between the two pitches not an integer (2:1 or 3:1). FIG. 7b similarly shows cases 14, 15 and 16, where a=345μ and b=190μ (a:b=1.5:1), a=320μ and b=240μ (a:b=1.33:1), and a=320μ and b=255μ (a:b=1.26:1) respectively. As will be clear from the graph, the best results occur where the ratio is not an integar, and falls in the range between 1.1:1 and 2:1.

Next, consideration is given to the number slits of the same pitch. FIG. 7c shows the reflected light intensity distribution where the respective numbers of slits are varied. On the basis of a case 11 where the first pitch a is 320μ and the second pitch b is 250μ, 17 is a case with one slit at each pitch, 18 is a case with 3 slits of each pitch, and 19 shows a case where their are 7 slits of each pitch. As will be clear from the graph, the incidents of flaring declines as the number of slits are increased, but at least 4 or 5 slits at each pitch is required.

Figure 8:
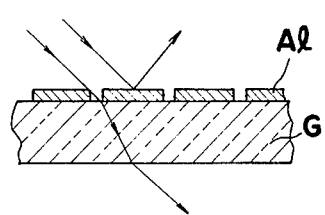
FIGS. 8 to 11 are cross-sectional views of the mirror arrangement of the present invention for the purpose of explaining the method of manufacture.

FIGS. 8 to 11 are cross-sectional views of mirrors 10 comprising a total reflection mirror surface with the light-transmitting slits described above. In FIG. 8, a glass substrate G is formed with a metallic reflector film Al of aluminum Al, which forms a reflection surface, the thickness of the film Al being determined in accordance with the desired reflectance. A mirror of this type could be produced by depositing the thin film (Al) on the glass substrate G to a desired thickness, and then removing, by etching etc., the film Al in accordance with the required form and dispositionof the light-transmitting slits.

Figure 9:
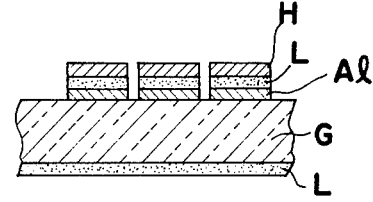

Further, the example of FIG. 9 has a reflectance increasing film comprising a low refractance inductive film L of $MgF_2$, $SiO_2$, etc., and a high refractance inductive film H of $ZrO_2$ or $TiO_2$, etc., coated on top of the reflective film Al in such order, wherein the thickness of the films L and H are respectively $\lambda/4$ for a design wavelength $\lambda$. A low refractance inductive film L of a thickness $\lambda/4$ is also provided on the rear surface of the glass substrate G, which serve as an additional transmission layer to prevent the light transmitted by the light-transmitting slits from being reflected by the rear surface of the glass substrate G. A mirror of this type would have the Al layer, the low refractance inductive layer L, and the high refractance inductive layer H deposited on the glass substrate G in that order, and the slits may be formed by removing the above three layers in the desired form and disposition of the slits by etching. The additional transmission layer on the rear surface of the glass substrate G may also be applied by vapor deposition when the low refractance inductive layer is deposited on the rear side. This construction enables both the light reflected by the mirror and that transmitted by the mirror to be increased.

Figure 10:
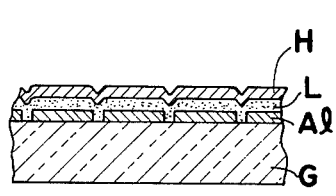

FIG. 10 shows a cross-sectional view of a mirror arrangement of another embodiment according to the present invention. After the Al layer has been deposited on the substrate G by vacuum evaporating, and the low and high refractance inductive layers are then deposited thereon by the vacuum evaporating in that order. This construction is utilized for increasing the refractance on the light-transmitting slits and for reducing the difference in intensity between the light reflected on the Al film and the light reflected on the slits, thus reducing the effects of diffraction. The width of the aluminum reflective portion is P1 ($\mu$), and the width of the transmitting portion of the slits is P2 ($\mu$), while the reflectance of the mirror is fixed at 60%. Table 1 shows the calculated intensity distribution of the reflected and diffracted light for a variety of combinations of the amplitude reflectance $\sqrt{r}\,1$ in the reflecting portion, and the amplitude reflectance $\sqrt{r}\,2$ in the transmitting portion, as well as various combinations of P1 and P2.

TABLE 1

| No. | P1(μ) | P2(μ) | $\sqrt{r_1}$ | $\sqrt{r_2}$ | Total Reflectance | Signal (%) (0-th) | Noise (%) (1-st) | Noise (%) (2-nd) | Noise (%) (3-rd) | Noise (%) (4-th) | Noise (%) (5-th) | Total (%) Noise | S/N |
|---|---|---|---|---|---|---|---|---|---|---|---|---|---|
| 1 | 150 | 100 | 1 | 0 | 60% | 36 | 9.17 | 0.88 | 0.39 | 0.57 | 0 | 24 | 1.5 |

TABLE 1-continued

| No. | $P_1^{(\mu)}$ | $P_2^{(\mu)}$ | $\sqrt{r_1}$ | $\sqrt{r_2}$ | Total Reflectance | Signal (%) (0-th) | Noise (%) (1-st) | Noise (%) (2-nd) | Noise (%) (3-rd) | Noise (%) (4-th) | Noise (%) (5-th) | Total (%) Noise | S/N |
|---|---|---|---|---|---|---|---|---|---|---|---|---|---|
| 2 | 150 | 120 | 1 | 0.1 | 60% | 48.46 | 4.59 | 0.14 | 0.39 | 0.12 | 0.08 | 11.54 | 4.2 |
| 3 | 100 | 100 | 1 | 0.2 | 60% | 52.36 | 3.10 | 0 | 0.34 | 0 | 0.12 | 7.64 | 6.9 |
| 4 | 75 | 100 | 1 | 0.3 | 60% | 54.99 | 1.97 | 0.10 | 0.14 | 0.08 | 0.02 | 5.01 | 11.0 |
| 5 | 50 | 200 | 1 | 0.5 | 60% | 58.63 | 0.30 | 0.20 | 0.09 | 0.02 | 0 | 1.37 | 42.8 |
| 6 | 150 | 75 | 0.8 | 0.2 | 60% | 55.56 | 1.52 | 0.38 | 0 | 0.10 | 0.06 | 4.44 | 12.5 |
| 7 | 150 | 50 | 0.7 | 0.3 | 60% | 58.43 | 0.42 | 0.21 | 0.05 | 0 | 0.02 | 1.57 | 37.2 |
| 8 | 150 | 75 | 0.9 | 0 | 60% | 40.00 | 6.84 | 1.71 | 0 | 0.43 | 0.27 | 20.00 | 2.0 |
| 9 | 150 | 50 | 0.8 | 0 | 60% | 45.00 | 4.05 | 2.03 | 0.45 | 0 | 0.16 | 15.00 | 4.0 |
| 10 | 150 | 25 | 0.7 | 0 | 60% | 51.43 | 1.34 | 1.08 | 0.75 | 0.42 | 0.17 | 8.57 | 6.0 |

Judged from the S/N ratios of table 1, the example numbers 4 to 7 are best, and to achieve the combination of amplitude reflectances $\sqrt{r}$ 1 and $\sqrt{r}$ 2 such as in numbers 4 to 7, a construction such as that in FIG. 10 is best. This is because $\sqrt{r}$ 2 can be made large. With the construction of FIG. 8, a combination of amplitude reflectances as in number 8 is achieved, while the construction of FIG. 9 gives the combination of amplitude reflectances as in number 1.

Figure 11:
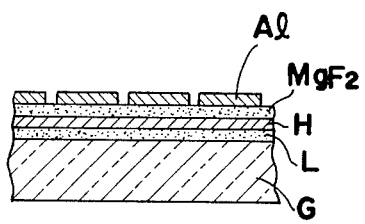

The example of FIG. 11 has a low refractance inductive film L and a high refractance inductive film H respectively of a thickness of λ/4 deposited on the glass substrate G in that order, and a film of $MgF_2$ ($MgF_2$) of a thickness of λ/2 deposited on top thereof, after which the Al layer is deposited thereon, and finally predetermined portions of the Al layer are removed for forming the slits by etching. In this construction, the $MgF_2$ film is utilized for preventing etching of the Al layer from effecting the layers beneath it.

In each of the proceeding embodiments, all the light-transmitting slits are of the same form, being continuous straight lines extending over the whole of the light-deviding portion. However, as long as the individual slits are of sufficient length in relation to their width, they need not be continuous straight lines, and may be broken at a number of points along their length. Also, as long as the width of the individual slits is the same in the longitudinal direction, the width may be varied at random in the lateral direction, within a range of up to 80μ.

Figure 12A:
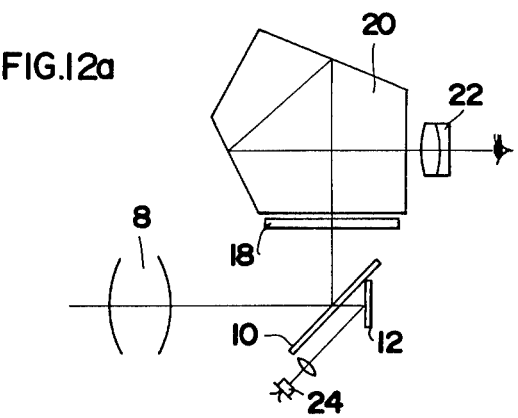
FIGS. 12a and 12b are diagrams illustrating another disposition of the light receptor and the slits in accordance with the present invention.
Figure 12B:
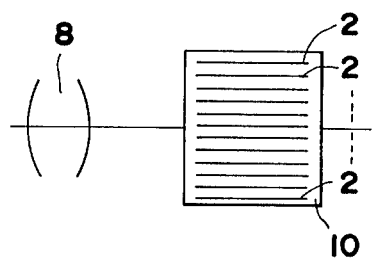

Further, in the above embodiments, all of the constructions are such that the light transmitted through the objective lens is divided by the mirror arrangement into reflected light for the viewfinder, and transmitted light for focusing detection, but the mirror arrangement of this invention is not limited to such application, and the light transmitted through the mirror may be directed to light receptor for measuring an intensity of the light. FIGS. 12a and 12b illustrate an example of this, where in the light-transmitting slits according to this invention are formed over the whole area of a total reflection mirror surface of the main mirror 10 of the single lens reflex camera, and the slits 2 are disposed to extend in the vertical direction as in the case of FIG. 2b where the transmitted light is conducted to a light receptor of a focus detection device. This construction divides the light transmitted through the objective lens 8 into reflected light which is directed to the viewfinder, and transmitted light which is directed to a light receptor 24 for measuring the intensity of the light.

Figure 13A:
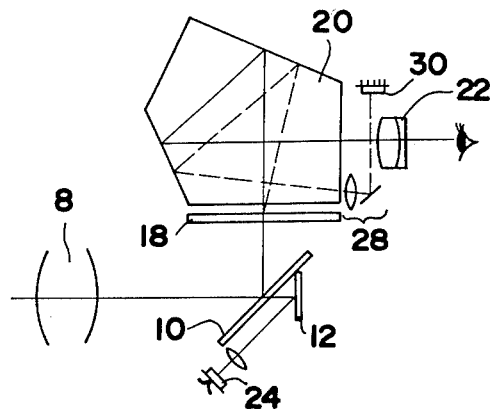
FIGS. 13a to 13c are diagram illustrating some further embodiments of the present invention.
Figure 13B:
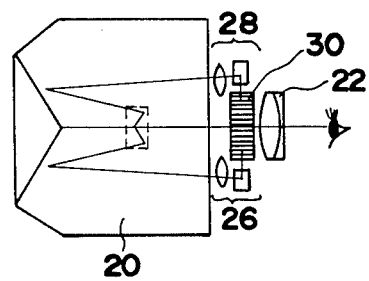
Figure 13C:
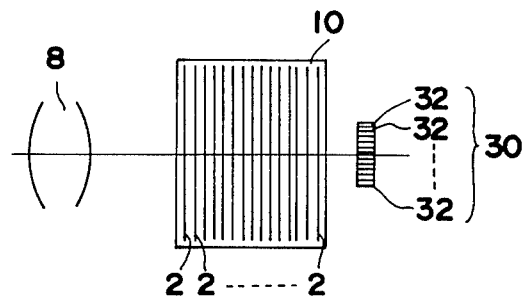

FIGS. 13a, 13b, and 13c further show an example of a single lens reflex camera which includes a light measuring device and a focus detection device, wherein a plurality of light-transmitting slits 2 of the same width and pitch as the embodiment of FIG. 1a are disposed over the whole of the total reflection mirror surface of the main mirror 10. An image sensor 30 comprises a plurality of light receiving cells 32 for detecting a focusing condition of the lens 8, and is arranged so as to receive two images which are transmitted by optical systems 26 and 28 respectively. The optical systems 26 and 28 are constructed to view an image formed on a focusing screen 18 from two different directions. The focus detecting device (not shown) is constructed to detect a focusing condition of the objective lens 8 based on a relative interval of the above two images by means of the output signals of the image sensor 30. As shown in FIG. 13c, a plurality of light transmitting slits 2 are arranged in parallel to the direction in which a plurality of light receiving cells 32 are arranged. The light transmitted through the main mirror 10 is reflected on the sub mirror 12 to a light receptor for measuring an intensity of the light.

As the embodiment is shown in FIGS. 13a, 13b, and 13c, the present invention can also be used in the case where the light transmitted through the objective lens is divided into reflected light for the viewfinder, and transmitted light for light measurement.

As detailed in the foregoing, the present invention relates to a mirror arrangement for use in a single lens reflex camera wherein the light transmitted through the objective lens is divided into two parts, that is reflected light that is directed to the viewfinder, and transmitted light that is directed to a light receptor, and wherein the light transmitted through the objective lens is divided by a total reflection mirror surface on which a plurality of light transmitting slits are arranged in parallel to each other. Each slit is no more than 80 μ in width, the pitch between adjacent slits includes at least two different pitches not less than twice the average width of all the slits. This construction causes the diffraction of the reflected light to be insignificant in the viewfinder, while maintaining a predetermined reflectance and transmittance within a predetermined light dividing area, to achieve an easy-to-see viewfinder image. Further, in this invention, since it is sufficient to inspect the arrangement of the slits in a single dimension, i.e. width and spacing, the mirror and the etching mask for the slits can be easily produced during the manufacturing of the mirror arrangement, thereby facilitating the manufacturing process, and production inspection

What is claimed is:
1. A mirror arrangement for use in a single lens reflex camera to divide a light transmitted through an objective lens into a first portion directed to a viewfinder and a second portion directed to a light receptor which detects a focusing condition of the objective lens or the like, comprising:
a total reflection mirror surface for reflecting a portion of the light transmitted through said objective lens to said viewfinder having a plurality of light transmitting slits, arranged in parallel to each other on said total reflection mirror surface, for directing another portion of the light transmitted through said objective lens to said light receptor, each of said slits having a width of less than 80 μ, each of the pitches between any two adjacent slits in a width direction thereof being more than two times the average of all said slits and being comprised of at least two different values.

2. The invention of claim 1, wherein said plurality of light transmitting slits are arranged at random pitches in the width direction.

3. The invention of claim 2, wherein a ratio between a minimum pitch and a maximum pitch is limited to a range of 1:1.1~ to 1:3.

4. The invention of claim 1, wherein all of the pitches are determined by repetition of a block unit.

5. The invention of claim 4, wherein said block unit comprises a first part in which the pitches are gradually increased and a second part in which the pitches are gradually decreased.

6. The invention of claim 5, wherein the number of the pitches in the first part is equal to number of the pitches in the second part.

7. The invention of claim 5, wherein the number of the pitches in the first part is different from the number of the pitches in the second part.

8. The invention of claim 5, wherein said block unit further comprises a third part in which the pitches are constant.

9. The invention of claim 5, wherein said block unit further comprises a third part in which the pitches are greatly varied.

10. The invention of claim 5, wherein the pitches in the first and second parts are varied in linear proportion to the position of the slits in the width direction.

11. The invention of claim 4, wherein said block unit comprises a first part in which the pitches are gradually increased, a second part in which the pitches are gradually decreased, a third part in which the pitches are gradually increased, and a fourth part in which the pitches are gradually increased in that order.

12. The invention of claim 11, wherein the number of the pitches in the first part is equal to the number of the pitches in the fourth part, and number of the pitches in the second part is equal to the number of the pitches in the third part.

13. The invention of claim 4, wherein the block unit comprises a first part in which the pitches have an identical constant value, and a second part in which the pitches have another identical constant value.

14. The invention of claim 13, wherein the number of the pitches in the first part is equal to the number of the pitches in the second part.

15. The invention of claim 1, wherein said light receptor comprises a plurality of light receiving cells arranged along a predetermined direction, and wherein said plurality of light transmitting slits are arranged in parallel to the predetermined direction.

16. The invention of claim 1, wherein said mirror arrangement comprises a substrate of transparent material, and a reflecting layer, disposed on said substrate, having a plurality of slit portions arranged in parallel to each other.

17. The invention of claim 1, wherein said mirror arrangement comprises a substrate of transparent material, a reflecting layer of metal, disposed on a front surface of said substrate, for forming a pattern which includes said plurality of light transmitting slits, a low refractance layer disposed on said pattern, and a high refractance layer disposed on said low reflectance layer in that order.

18. The invention of claim 17, further comprising a low refractance layer disposed on a rear surface of said substrate.

19. The invention of claim 1, wherein said mirror arrangement comprises a substrate of transparent material, a reflecting layer of metal, disposed on said substrate, having a plurality of light transmitting slits, a low refractance layer disposed on said reflecting layer including said slits, and a high refractance layer disposed on said low refractance layer.

20. The invention of claim 1, wherein said mirror arrangement comprises a substrate of transparent material, a low refractance layer disposed on said substrate, a high refractance layer disposed on said low refractance layer, a layer of $MgF_2$ disposed on said high refractance layer, and a reflecting layer of metal, disposed on said layer of $MgF_2$, having said plurality of light transmitting slits.

* * * * *

UNITED STATES PATENT AND TRADEMARK OFFICE
CERTIFICATE OF CORRECTION

PATENT NO. : 4,461,557

DATED : July 24, 1984

INVENTOR(S) : Kazuo Kimura

It is certified that error appears in the above-identified patent and that said Letters Patent is hereby corrected as shown below:

```
Column 2, Line 41, delete "of"
Column 5, Line 18, delete "to"
Column 9, Line 46, after "and" insert --the--
```

Signed and Sealed this

Thirteenth Day of December, 1988

Attest:

DONALD J. QUIGG

Attesting Officer

Commissioner of Patents and Trademarks